(12) United States Patent
Freidauer et al.

(10) Patent No.: US 6,502,400 B1
(45) Date of Patent: Jan. 7, 2003

(54) COMBUSTOR DOME ASSEMBLY AND METHOD OF ASSEMBLING THE SAME

(75) Inventors: Max Joseph Freidauer, New Haven, CT (US); Michael Philip Hagle, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/575,416

(22) Filed: May 20, 2000

(51) Int. Cl.[7] ............................. F02G 13/10; F02G 3/00
(52) U.S. Cl. ............................. 60/772; 60/796; 60/799; 60/748; 60/740; 239/402; 239/403; 239/404
(58) Field of Search ........................ 60/748, 39.31, 60/39.32, 740; 239/402, 403, 404

(56) References Cited

U.S. PATENT DOCUMENTS

| | | | |
|---|---|---|---|
| 2,800,768 A | 7/1957 | Wheeler | 60/39.74 |
| 3,930,369 A | 1/1976 | Verdouw | 60/39.65 |
| 4,525,996 A | 7/1985 | Wright et al. | 60/39.31 |
| 4,787,209 A | * 11/1988 | Taylor et al. | 60/757 |
| 5,154,060 A | 10/1992 | Walker et al. | 60/746 |
| 6,212,870 B1 | * 4/2001 | Thompson et al. | 60/39.02 |

FOREIGN PATENT DOCUMENTS

| EP | 837284 A3 | 4/1998 |
|---|---|---|
| EP | 837284 A2 | 4/1998 |

* cited by examiner

*Primary Examiner*—Cheryl J. Tyler
*Assistant Examiner*—William Rodriguez
(74) *Attorney, Agent, or Firm*—Rodney M. Young; Pierce Atwood

(57) ABSTRACT

A combustor dome assembly includes a spectacle plate having an opening formed therein that defines an inner circumferential edge, at least one swirler assembly defining an inner cylindrical surface, and at least one deflector having an outer cylindrical surface. These components are arranged such that the outer cylindrical surface is joined to the inner circumferential edge and to the inner cylindrical surface. One preferred method of manufacturing the combustor dome assembly includes placing a first ring of joining material over the outer cylindrical surface. Then, the outer cylindrical surface is inserted into the spectacle plate opening so that the first ring is sandwiched between a first surface of the spectacle plate and a shoulder formed on the deflector. A second ring of joining material is next placed over the outer cylindrical surface, and a third ring of joining material is inserted into an annular groove formed in the inner cylindrical surface. The next step is to place the swirler assembly over the outer cylindrical surface so that the second ring is sandwiched between a second surface of the spectacle plate and an end of the swirler assembly and the third ring surrounds the outer cylindrical surface. The first, second and third rings are then heated to a temperature greater than their melting points so that they become molten joining material. The molten joining material is cooled to complete the joint.

12 Claims, 3 Drawing Sheets

COMBUSTOR DOME ASSEMBLY AND METHOD OF ASSEMBLING THE SAME

STATEMENT REGARDING FEDERALLY SPONSORED RESEARCH & DEVELOPMENT

The U.S. Government may have certain rights in this invention pursuant to contract number F33615-98-C-2903 awarded by the Department of the Air Force.

BACKGROUND OF THE INVENTION

This invention relates generally to gas turbine engines and more particularly to combustor dome assemblies used in such engines.

A gas turbine engine includes a compressor that provides pressurized air to a combustor wherein the air is mixed with fuel and burned for generating hot combustion gases. These gases flow downstream to one or more turbines that extract energy therefrom to power the compressor and provide useful work such as powering an aircraft in flight. Combustors used in aircraft engines typically include inner and outer combustion liners joined at their upstream ends to a dome assembly. The dome assembly includes an annular spectacle plate and a plurality of circumferentially spaced swirler assemblies mounted therein for introducing the fuel/air mixture to the combustion chamber. Each swirler assembly has a deflector extending downstream therefrom for preventing excessive dispersion of the fuel/air mixture and shielding the spectacle plate from the hot combustion gases of the combustion chamber.

Typically, the swirler assemblies, deflectors and spectacle plate are joined together by a technique such as brazing. In one conventional dome assembly, the outer diameter of the swirler assembly is brazed into an opening in the spectacle plate in one operation, and the deflector is brazed into the inner diameter of the swirler assembly in another operation. The manufacture of such a dome assembly requires several time consuming procedures, utilizes multiple fixtures and many expensive materials, and is relatively labor intensive. For instance, in the first operation, the swirler assembly is fixtured to the spectacle plate using a special fixture so that the swirler assembly can be tack welded to the spectacle plate. The tack weld fixture is then removed and a stop-off paste is applied to the spectacle plate. Next, a braze alloy paste is placed in the gap between the swirler assembly and the spectacle plate opening. The assembly is then heated to a temperature exceeding the braze alloy melting point such that the braze alloy melts and fills the gap. The assembly is then allowed to cool so that the braze alloy solidifies and joins the swirler assembly to the spectacle plate.

In the second operation, stop-off material and two forms of braze alloy (sinter braze tape and braze rope) are applied to the deflector. The deflector is then fixtured into the swirler assembly/spectacle plate sub-assembly using another fixture. Milk of magnesia is applied to this fixture to prevent seizing during subsequent heating. This assembly is then heated to a temperature exceeding the braze alloy melting point such that the braze alloy melts and fills the swirler assembly/deflector interface. The assembly is then allowed to cool so that the braze alloy solidifies and joins the deflector to the swirler assembly. The fixture is then removed.

Each different step, material and fixture used in these two operations increases the complexity and cost of manufacturing the dome assembly. Furthermore, the swirler assembly is not centered when inserted into the spectacle plate because there is some nominal gap to allow for braze alloy fill. This enables the swirler assembly/spectacle plate braze joint gap to be uneven around the circumference of the interface. In the worse case, the swirler assembly makes contact with the spectacle plate. Then, there is no braze gap where the contact is made, and there is an excessive gap opposite of the contact location.

This dome assembly design uses braze alloy in paste and rope form. Such materials are only 50% braze alloy, with the remainder being a binder. When the paste and rope are liquefied during the brazing steps, the binder burns off so that only the braze alloy remains to fill the braze gaps. Thus, braze alloy in paste and rope form is only 50% volumetrically efficient. The amount of braze alloy applied is difficult to accurately control because, in addition to being volumetrically inefficient, braze alloy paste is typically applied by hand using a syringe. Volumetric braze alloy control is important in forming combustor dome joints. Too much alloy will fill the gap and run over onto adjacent surfaces where cooling holes and surface enhancements may be obstructed. Too little alloy leaves voids in the braze gap creating a weak joint.

It is therefore desirable to have a combustor dome assembly that is easier, less time consuming and less expensive to manufacture.

BRIEF SUMMARY OF THE INVENTION

The above-mentioned need is met by the present invention that provides a combustor dome assembly including a spectacle plate having an opening formed therein that defines an inner circumferential edge, at least one swirler assembly defining an inner cylindrical surface, and at least one deflector having an outer cylindrical surface. These components are arranged such that the outer cylindrical surface of the deflector is joined to the inner circumferential edge of the spectacle plate and to the inner cylindrical surface of the swirler assembly.

One preferred method of manufacturing the combustor dome assembly includes placing a first ring of joining material over the outer cylindrical surface of the deflector. Then, the outer cylindrical surface is inserted into the spectacle plate opening so that the first ring is sandwiched between a first surface of the spectacle plate and a shoulder formed on the deflector. A second ring of joining material is next placed over the deflector's outer cylindrical surface, and a third ring of joining material is inserted into an annular groove formed in the inner cylindrical surface of the swirler assembly. The next step is to place the swirler assembly over the outer cylindrical surface so that the second ring is sandwiched between a second surface of the spectacle plate and an end of the swirler assembly and the third ring surrounds the outer cylindrical surface. The first, second and third rings are then heated to a temperature greater than their melting points so that they become molten joining material. The molten joining material is cooled to complete the joint.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing FIGS. in which:

DETAILED DESCRIPTION OF THE INVENTION

Figure 1:
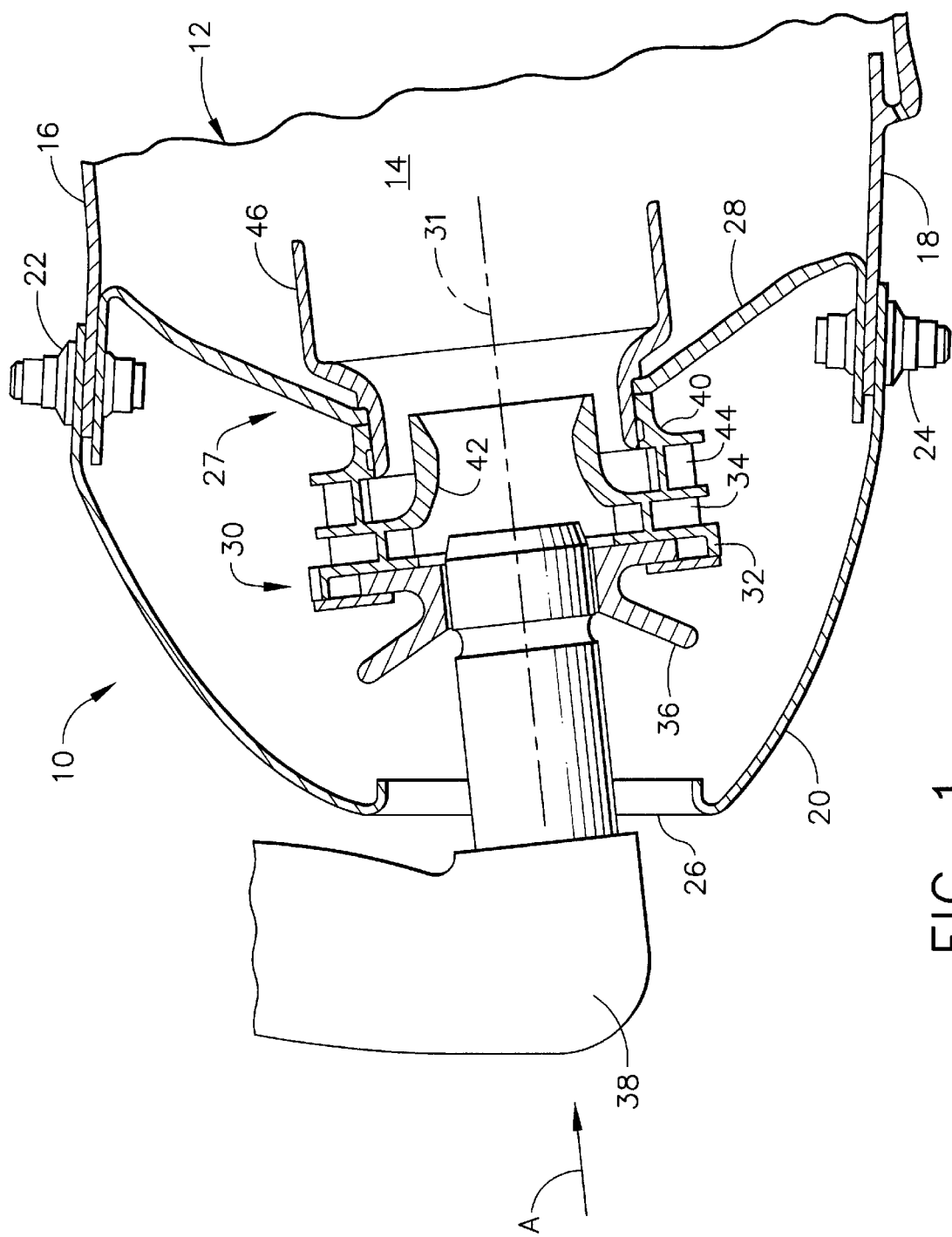
FIG. 1 is an axial sectional view of the forward portion of a combustor showing one embodiment of the present combustor dome assembly.

Referring to the drawings wherein identical reference numerals denote the same elements throughout the various views, FIG. 1 shows the forward end of a combustor 10 of the type suitable for use in a gas turbine engine and including a hollow body 12 defining a combustion chamber 14 therein. The hollow body 12 is generally annular in form and is defined by an outer liner 16 and an inner liner 18. The upstream end of the hollow body 12 is substantially closed off by a cowl 20 attached to the outer liner 16 by a first fastener 22 and to the inner liner 18 by a second fastener 24. At least one opening 26 is formed in the cowl 20 for the introduction of fuel and compressed air. The compressed air is introduced into the combustor 10 from a compressor (not shown) in a direction generally indicated by arrow A of FIG. 1. The compressed air passes primarily through the opening 26 to support combustion and partially into the region surrounding the hollow body 12 where it is used to cool both the liners 16, 18 and turbomachinery further downstream.

Located between and interconnecting the outer and inner liners 16, 18 near their upstream ends is a dome assembly 27 disposed coaxially about the centerline axis of the engine. The dome assembly 27 includes an annular spectacle plate 28 and a plurality of circumferentially spaced swirler assemblies 30 (only one shown in FIG. 1) mounted in the spectacle plate 28. The spectacle plate 28 is attached to the outer and inner liners 16, 18 via the first and second fasteners 22, 24. Each swirler assembly 30 includes a primary swirler 32 that comprises a plurality of angularly directed swirl vanes 34. The vanes 34 are angled with respect to the axial centerline 31 of the swirler assembly 30 so as to impart a swirling motion to the air flow. A ferrule 36 is loosely mounted on the forward end of the primary swirler 32 and coaxially receives a fuel nozzle 38.

The swirler assembly 30 further includes a secondary swirler 40 that adjoins the primary swirler 32, downstream thereof, and is fixed with respect to the spectacle plate 28. The secondary swirler 40 includes a venturi 42 and a plurality of circumferentially spaced swirl vanes 44 disposed coaxially about the venturi 42. The venturi 42 and the ferrule 36 of the primary swirler 32 are both coaxially aligned with the axial centerline 31 of the swirler assembly 30. Air from the opening 26 passes through the primary swirl vanes 34. The swirling air exiting the vanes 34 interacts with fuel injected from the fuel nozzle 38 so as to mix as it passes into the venturi 42. The secondary swirl vanes 44 then act to present a swirl of air swirling in the opposite direction that interacts with the fuel/air mixture so as to further atomize the mixture and prepare it for combustion in the combustion chamber 14. Each swirler assembly 30 has a deflector 46 extending downstream therefrom for preventing excessive dispersion of the fuel/air mixture and shielding the spectacle plate 28 from the hot combustion gases in the combustion chamber 14.

It should be noted that, although FIG. 1 illustrates a combustor dome assembly in a single annular combustor, the present invention is equally applicable to other types of combustors, including multi-annular combustors. It should also be noted that the present invention is also applicable to other types of swirler assemblies as well.

Figure 2:
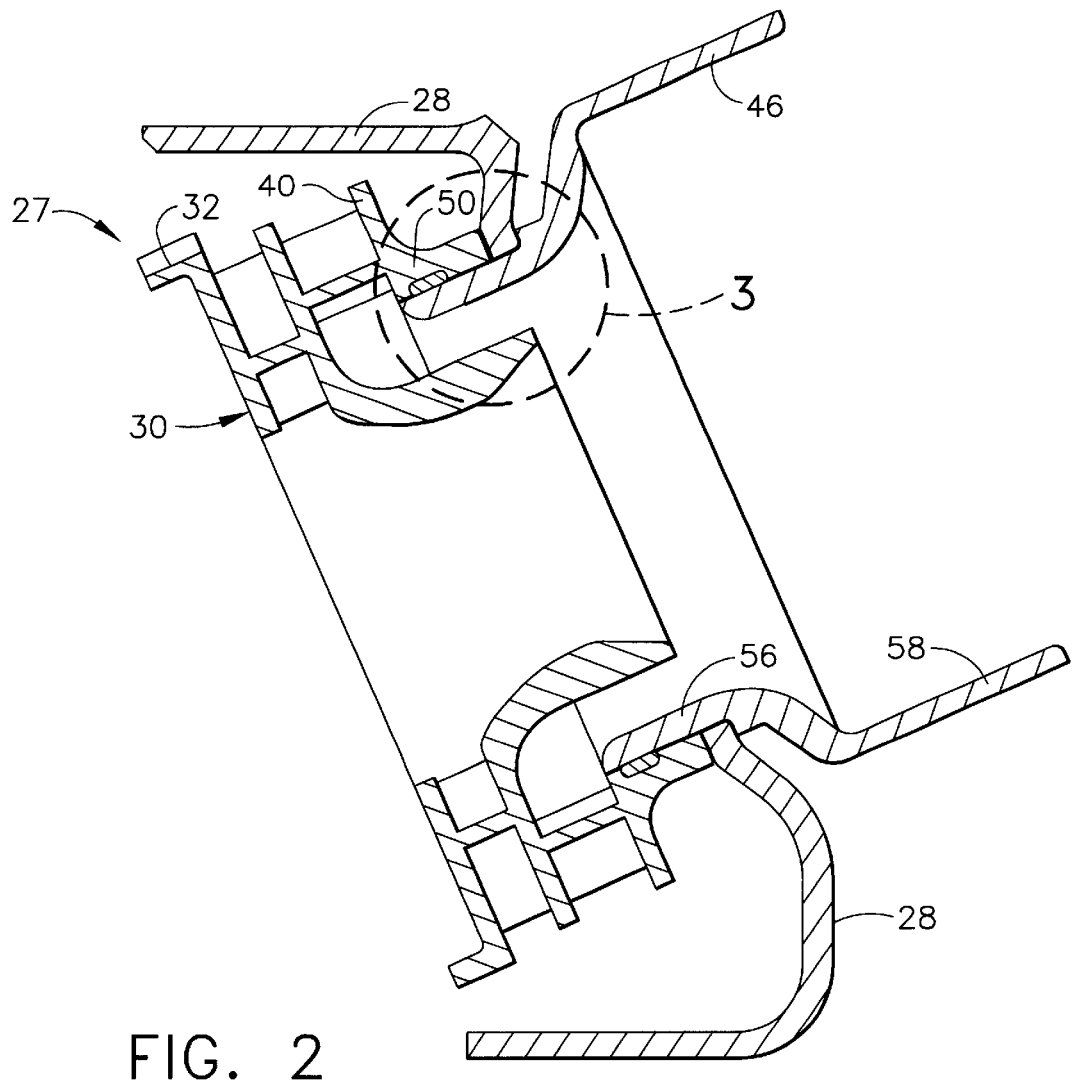
FIG. 2 is an enlarged sectional view of the combustor dome assembly of FIG. 1.
Figure 3:
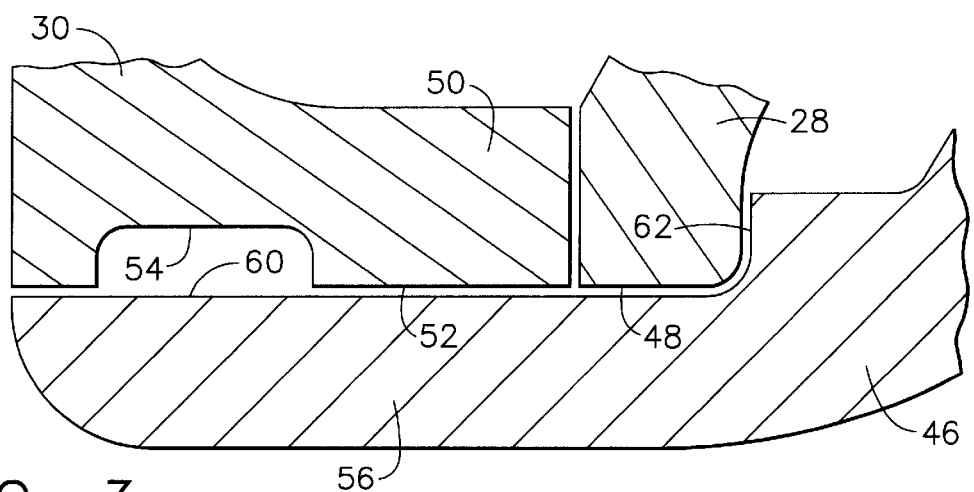
FIG. 3 is an enlarged detail view of the portion of the combustor dome assembly enclosed by the circle 3 of FIG. 2.

Turning now to FIGS. 2 and 3, the dome assembly 27 is shown in more detail. The spectacle plate 28 includes a plurality of circumferentially spaced, round openings formed therein. One of the swirler assemblies 30 and one of the deflectors 46 are fixedly joined to the spectacle plate 28 by a joint at each of the openings. Each spectacle plate opening defines an inner circumferential edge 48 (FIG. 3) having a given inside diameter. Each swirler assembly 30 has a cylindrical flange 50 extending axially from the aft end of the secondary swirler 40. Each flange 50 defines an inner cylindrical surface 52 having a given inside diameter that is preferably equal to the inside diameter of the spectacle plate openings. An annular groove 54 is formed in the inner cylindrical surface 52 of each flange 50, intermediate of the flange's forward and aft ends. Each swirler assembly 30 is positioned relative to the corresponding spectacle plate opening so that the cylindrical flange 50 is coaxially aligned with the spectacle plate opening and the aft end of the flange 50 adjoins the forward surface of the spectacle plate 28.

Each deflector 46 includes a tubular mounting portion 56 and an integrally formed flare portion 58. Each tubular mounting portion 56 defines an outer cylindrical surface 60 having a given outside diameter. The outer cylindrical surface 60 extends axially from the forward end of the tubular mounting portion 56 to a forward facing annular shoulder 62 located near the junction of the tubular mounting portion 56 and the flare portion 58. The tubular mounting portions 56 are disposed coaxially within a respective one of the spectacle plate openings and the cylindrical flange 50 of the corresponding swirler assembly 30 such that the flare portions 58 are located aft of the spectacle plate 28. The aft surface of the spectacle plate 28 adjoins the annular shoulder 62, and the forward ends of the cylindrical flange 50 and the tubular mounting portion 56 are preferably axially aligned with one another.

The outer cylindrical surfaces 60 are knurled; i.e., provided with a series of small ridges or beads. The knurling is typically in a diamond-shaped pattern, although other knurl patterns are possible. Alternatively, the inner circumferential edges 48 and the inner cylindrical surfaces 52 could be knurled instead of the outer cylindrical surfaces 60. However, the outer cylindrical surfaces 60 are the preferred surfaces to knurl, as they are significantly easier to knurl than the two inside surfaces. Similarly, the aforementioned annular grooves 54 could be formed in the outer cylindrical surfaces 60 instead of the inner cylindrical surfaces 52. In this case, however, the inner cylindrical surfaces 52 are preferred because the flanges 50 are generally thicker than the tubular mounting portions 56.

The outside diameter of the outer cylindrical surfaces 60 (as defined by the peaks of the knurling) is substantially equal to the inside diameters of the spectacle plate openings and the cylindrical flange 50. Each outer cylindrical surface 60 thus provides an interference fit with the corresponding spectacle plate opening and cylindrical flange 50. The swirler assemblies 30 and the deflectors 46 can thus be joined to the spectacle plate 28 without separate fixturing or tack welding. The deflectors 46 are also automatically centered with respect to the corresponding spectacle plate openings and swirler assemblies 30, thereby eliminating uneven gaps. As will be described below, the troughs of the knurling permit joining material to flow around the entire interface between each deflector 46 and the spectacle plate 28 and corresponding swirler assembly 30.

The swirler assemblies 30 and the deflectors 46 are preferably joined to the spectacle plate 28 by brazing or a similar joining technique such as soldering. Rather than joining the outer surface of each swirler assembly to the spectacle plate in one operation and then joining each deflector into the inner diameter of the corresponding swirler assembly in another operation, the spectacle plate 28, the swirler assemblies 30 and the deflector 46 are joined together in a single operation without the need for fixturing.

A preferred process for manufacturing the dome assembly 27 uses two foil rings of joining material and a solid ring of joining material for each joint. The foil rings are thin sheet pieces shaped like a washer. The solid ring is substantially thicker and is sized to be received in the annular groove 54 formed inside each of the cylindrical flanges 50. Although joining materials such as solder metals, welding materials and flowable nonmetallic adhesives could be used, the joining material is preferably a braze alloy with a lower melting point than the material or materials from which the spectacle plate 28, the swirler assemblies 30 and the deflectors 46 are made. For example, if the spectacle plate 28, the swirler assemblies 30 and the deflectors 46 are all made of the superalloy Mar-M-509 having a nominal composition of about 52 weight percent cobalt, 23 weight percent chromium, 10 weight percent nickel, 7 weight percent tungsten, 3.5 weight percent tantalum, balance nickel and impurities, or the superalloy L605 having a nominal composition of about 52 weight percent cobalt, 20 weight percent chromium, 10 weight percent nickel, 15 weight percent tungsten, balance nickel and impurities, then a preferred braze alloy is AMS 4779 having a nominal composition of about 94 weight percent nickel, 3.5 weight percent silicon, 1.8 weight percent boron, balance impurities. The foil and solid braze alloy rings are all made of nearly 100% braze alloy and are precision manufactured pieces so that each foil ring and each solid ring has the same volume. For instance, the foil rings can be manufactured from stamped sheets and the solid ring could be drawn wire. This permits consistent and accurate control over the volume and location of the applied braze alloy, which prevents areas of the joints from having too much or too little braze alloy.

Figure 4:
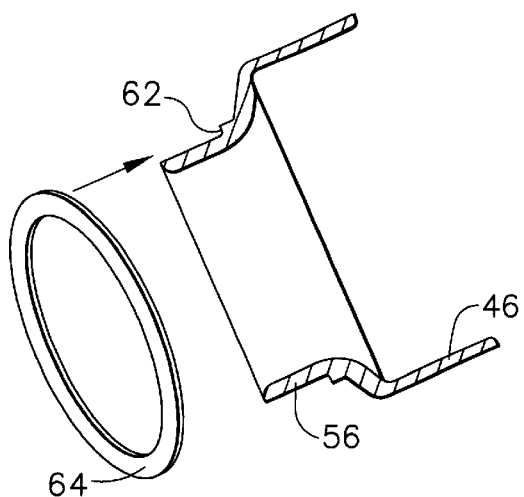
FIG. 4 is an axial sectional view illustrating one step in the manufacture of the combustor dome assembly.

As shown in FIG. 4, the first step is to place a first foil braze alloy ring 64 over the tubular mounting portion 56 of a first one of the deflectors 46 and against the annular shoulder 62. The deflector 46 is then inserted into its spectacle plate opening such that the first foil braze alloy ring 64 is sandwiched between the aft surface of the spectacle plate 28 and the annular shoulder 62. As mentioned above, the outer cylindrical surface 60 of the deflector 46 provides an interference fit with the corresponding spectacle plate opening. The interference-fit insertion may be accomplished by a force fit, or other known techniques such as cooling the deflector 46 to contract it prior to insertion, or heating the spectacle plate 28 to expand the opening prior to insertion, or a combination thereof.

Figure 5:
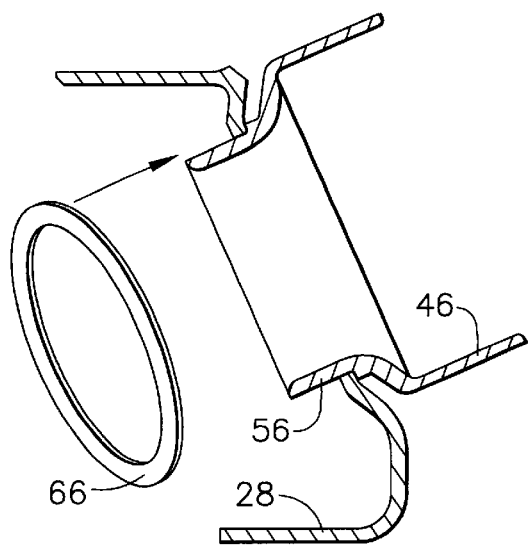
FIG. 5 is an axial sectional view illustrating another step in the manufacture of the combustor dome assembly.
Figure 6:
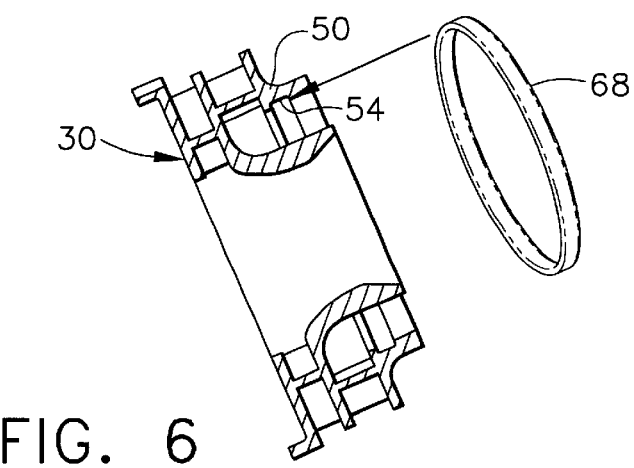
FIG. 6 is an axial sectional view illustrating yet another step in the manufacture of the combustor dome assembly.

Next, a second foil braze alloy ring 66 is placed over the tubular mounting portion 56 and against the forward surface of the spectacle plate 28 as seen in FIG. 5. A solid braze alloy ring 68 is inserted into the annular groove 54 in a first one of the swirler assemblies 30 as seen in FIG. 6. The cylindrical flange 50 is then placed onto the portion of the tubular mounting portion 56 extending forward of the spectacle plate 28. The swirler assembly 30 is positioned relative to the spectacle plate 28 and the deflector 46 (as shown in FIG. 2) so that the second foil braze alloy ring 66 is sandwiched between the forward surface of the spectacle plate 28 and the solid braze alloy ring 68 surrounds the outer cylindrical surface 60 of the tubular mounting portion 56. The outer cylindrical surface 60 also forms an interference fit with the cylindrical flange 50. Due to the interference fits, the spectacle plate 28, the swirler assembly 30 and the deflector 46 are all held in fixed relationship with one another. Consequently, there is no need to use separate fixturing or tack welding while permanently joining the parts together.

The foregoing, steps are repeated for each one of the swirler assemblies 30 and its corresponding deflector 46. Once all of the swirler assemblies 30 and the deflectors 46 are thus mounted onto the spectacle plate 28, the braze alloy rings 64, 66 and 68 are heated (typically by heating, the entire assembly) to a temperature greater than the melting, point of the braze alloy. The braze alloy melts and flows throughout each joint. The troughs formed in the knurled outer surfaces 60 permit the melted braze alloy to flow throughout the interfaces between the deflectors 46 and the spectacle plate 28 and corresponding swirler assemblies 30 by capillary action. The reflowed braze alloy is subsequently cooled to a temperature below its melting point. The braze alloy solidifies, thereby joining the spectacle plate 28, the swirler assemblies 30 and the deflectors 46 together. Specifically, the outer cylindrical surface 60 of each deflector 46 is joined to the corresponding inner circumferential edges 48 and to the inner cylindrical surfaces 52. Also, the aft ends of the cylindrical flanges 50 are joined to the forward surface of the spectacle plate 28.

As mentioned above, by using precision manufactured braze alloy rings 64, 66 and 68 that are nearly 100% braze alloy, consistent and accurate control over the volume and location of the applied braze alloy is obtained. This prevents areas of the joints from having too much or too little braze alloy. That is, molten braze alloy fills the interfaces between the outer cylindrical surfaces 60 and the inner circumferential edges 48 and the inner cylindrical surfaces 52 without overflowing. Likewise, the interfaces between the aft ends of the cylindrical flanges 50 and the forward surface of the spectacle plate 28 are filled without overflow. As a result, there is no need to use stop-off on adjacent surfaces.

The foregoing has described a combustor dome assembly having an improved joint for joining the spectacle plate, swirler assemblies and deflectors together. The improved joint greatly enhances the producibility of the dome assembly. Specifically, the three dome assembly components are joined together in a single operation without fixturing rather than multiple operations using multiple fixtures. Furthermore, the improved joint utilizes fewer raw materials, requires less manufacturing time and is more volumetrically efficient than conventional dome assembly joints. The improved joint also automatically centers the joined parts with respect to one another, thereby avoiding uneven and weak joints. The result is a dome assembly that is easier and less expensive to manufacture.

While specific embodiments of the present invention have been described, it will be apparent to those skilled in the art that various modifications thereto can be made without departing from the spirit and scope of the invention as defined in the appended claims.

What is claimed is:

1. A combustor dome assembly comprising:
   a spectacle plate having an opening formed therein, said spectacle plate opening defining an inner circumferential edge;
   a swirler assembly defining an inner cylindrical surface; and
   a deflector having an outer cylindrical surface, said outer cylindrical surface being joined to said inner circumferential edge and to said inner cylindrical surface, wherein at least one of said outer cylindrical surface, said inner circumferential edge and said inner cylindrical surface is knurled.

2. The combustor dome assembly of claim 1 wherein said swirler assembly has an end that is joined to said spectacle plate.

3. The combustor dome assembly of claim 1 wherein said deflector has a shoulder that adjoins said spectacle plate.

4. The combustor dome assembly of claim 1 further comprising an annular groove formed in one of said inner cylindrical surface or said outer cylindrical surface.

5. The combustor dome assembly of claim 1 wherein said outer cylindrical surface defines an interference fit with said inner circumferential edge and with said inner cylindrical surface.

6. A combustor dome assembly comprising:
   a spectacle plate having an opening formed therein, said spectacle plate opening defining an inner circumferential edge;
   a swirler assembly having a cylindrical flange, said cylindrical flange defining an inner cylindrical surface;
   a deflector having a tubular mounting portion and a flare portion, said tubular mounting portion being disposed within said spectacle plate opening and said cylindrical flange and defining an outer cylindrical surface; and
   joining material disposed between said outer cylindrical surface and said inner circumferential edge and between said outer cylindrical surface and said inner cylindrical surface.

7. The combustor dome assembly of claim 6 wherein said cylindrical flange has an annular groove formed in said inner cylindrical surface.

8. The combustor dome assembly of claim 6 wherein said joining material is a braze alloy.

9. The combustor dome assembly of claim 6 wherein said deflector has a shoulder that adjoins a first surface of said spectacle plate.

10. The combustor dome assembly of claim 9 wherein said cylindrical flange has an end that adjoins a second surface of said spectacle plate, and further comprising joining material disposed between said cylindrical flange end and said second surface of said spectacle plate.

11. The combustor dome assembly of claim 6 wherein said outer cylindrical surface is knurled.

12. The combustor dome assembly of claim 11 wherein said outer cylindrical surface defines an interference fit with said inner circumferential edge and with said inner cylindrical surface.

* * * * *